United States Patent [19]
Goto et al.

[11] Patent Number: 4,619,511
[45] Date of Patent: Oct. 28, 1986

[54] WARNING SYSTEM FOR REMAINING AMOUNT OF FILM IN A CAMERA

[75] Inventors: Tetsuro Goto, Funabashi; Yoshiyuki Nakano, Tokyo, both of Japan

[73] Assignee: Nippon Kogaku K. K., Tokyo, Japan

[21] Appl. No.: 797,666

[22] Filed: Nov. 13, 1985

[30] Foreign Application Priority Data

Nov. 19, 1984 [JP] Japan .................. 59-244267

[51] Int. Cl.⁴ ............................................. G03B 17/36
[52] U.S. Cl. ..................................................... 354/217
[58] Field of Search ........................................... 354/217

[56] References Cited
U.S. PATENT DOCUMENTS 4,561,741 12/1985 Ishizaka et al. ................ 354/217 X Primary Examiner—Michael L. Gellner
Attorney, Agent, or Firm—Shapiro and Shapiro

[57] ABSTRACT

A system consists of a camera provided with warning means to be activated by a detection switch which is closed in cooperation with a film counter, and an accessory unit to be mounted on the camera, wherein the accessory unit is provided with means for generating a warning signal for activating the warning means when the count of shot signals of the camera reaches a number of exposures preset in the accessory unit.

10 Claims, 6 Drawing Figures

F I G. 2
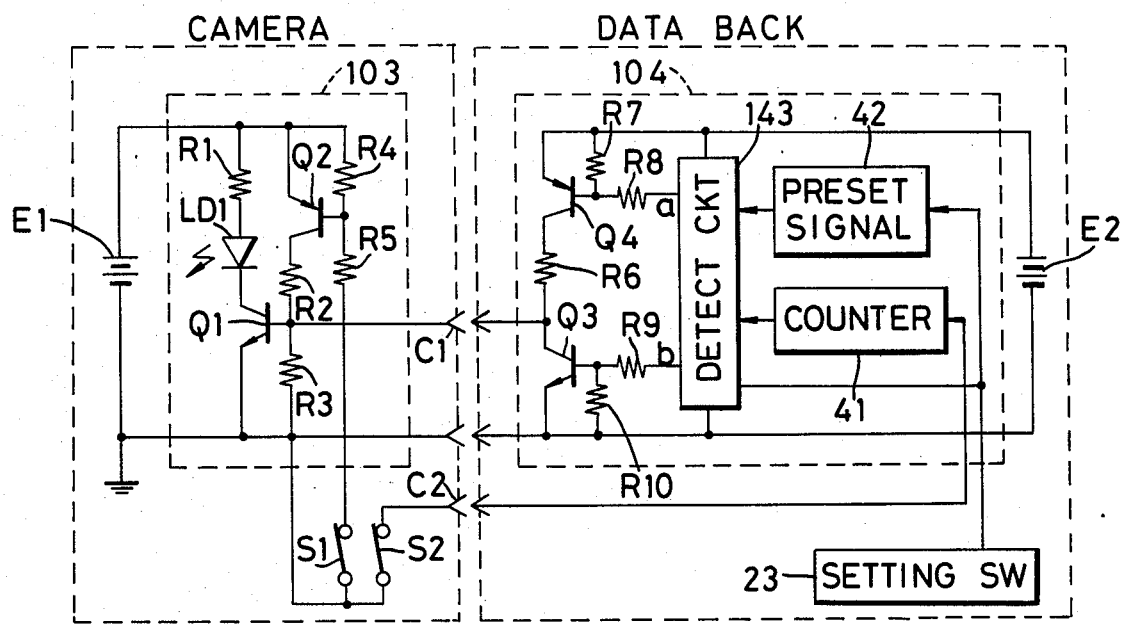
F I G. 3
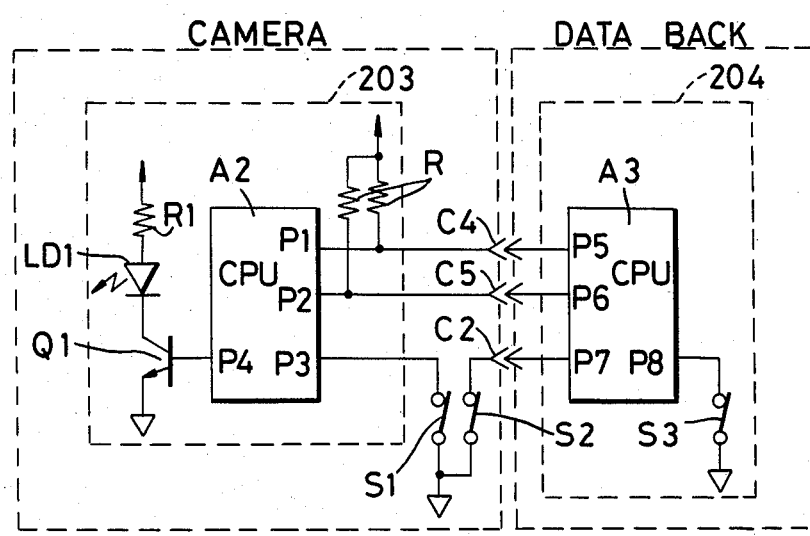

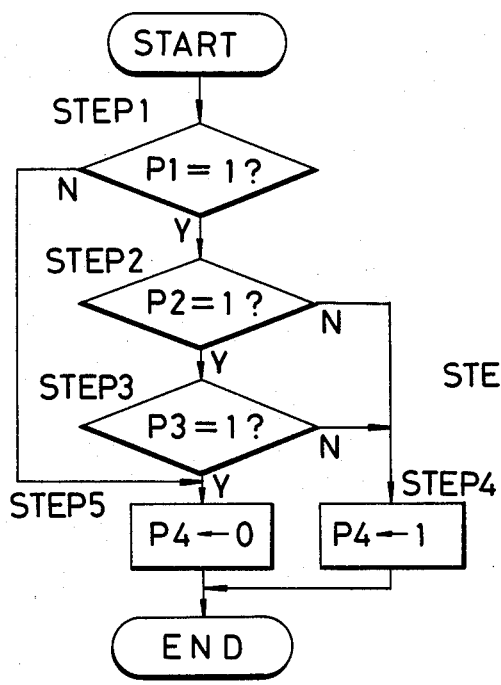
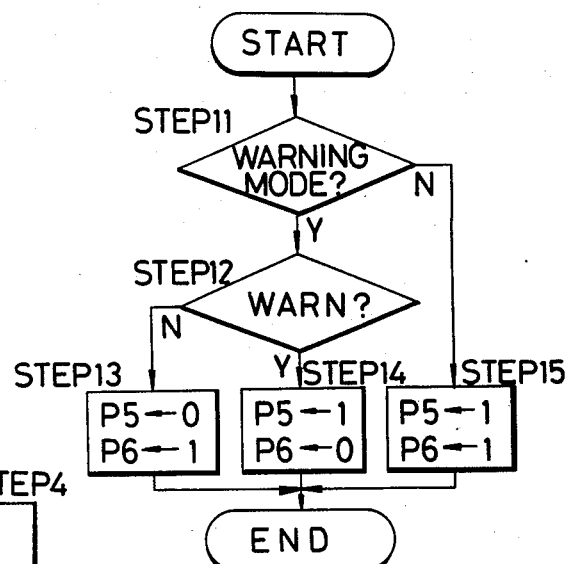
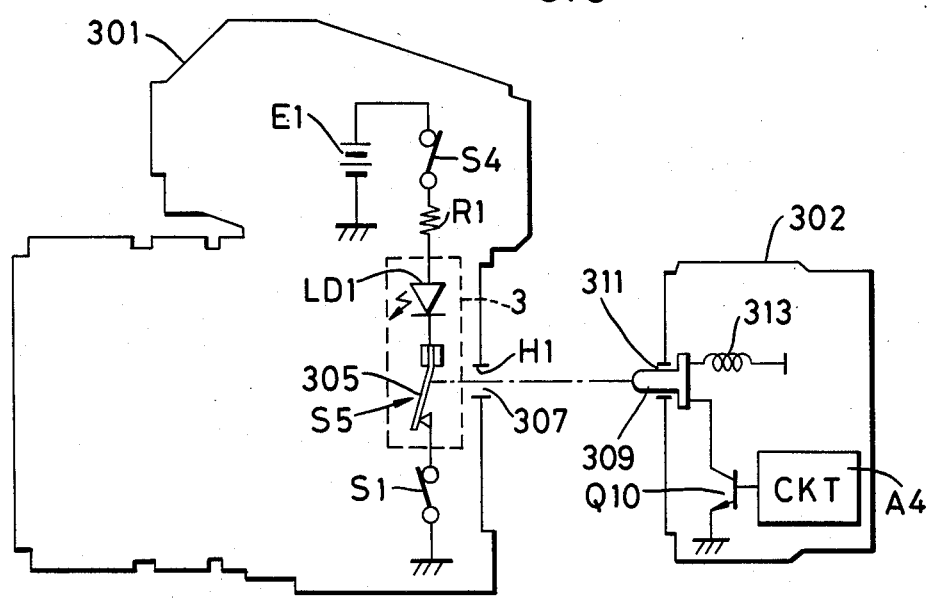

WARNING SYSTEM FOR REMAINING AMOUNT OF FILM IN A CAMERA

BACKGROUND OF THE INVENION

1. Field of the Invention

The present invention relates to a warning system for the remaining amount of a film in a photographic camera.

2. Description of the Prior Art

There is already known a camera which provides a warning when the number of shots approaches the number of possible exposures of the loaded film. For example, when the number of shots reaches a determined value, a switch is closed through a link with the film counter to provide a warning, indicating that the remaining amount of film has decreased.

However, if the warning is always given after 30 shots for example when a film roll of 36 exposures is used, such warning may be felt too early or too late for the user depending on the mode of his use. Also in such structure the warning is undesirably given after 30 shots even when a magazine containing a film for 100 or 250 exposures is loaded in the camera.

SUMMARY OF THE INVENTION

In consideration of the foregoing, an object of the present invention is to provide a system for activating a warning device, equipped in a camera for, for the remaining amount of the film by means of a warning signal from an accessory unit to be mounted on the camera.

Another object of the present invention is to provide an accessory unit adapted for use in the above-mentioned system.

The foregoing objects can be achieved according to the present invention by a system consisting of a camera provided with warning means to be activated by a detection switch which is closed in cooperation with a film counter, and an accessory unit to be mounted on said camera, wherein said accessory unit is provided with means for generating a warning signal for activating said warning means when the count of shot signals of said camera reaches a number of exposures preset in said accessory unit.

BRIEF DESCRIPTION OF THE DRAWINGS

FIG. 2 is a circuit diagram showing a second embodiment of the present invention;

FIG. 3 is a circuit diagram showing a third embodiment of the present invention;

FIG. 4 is a flow chart showing the function of a microcomputer A2 shown in FIG. 3;

FIG. 5 a flow chart showing the function of a microcomputer A3 shown in FIG. 3; and FIG. 6 is a schematic view showing a fourth embodiment of the present invention.

DESCRIPTION OF THE PREFERRED EMBODIMENTS

Figure 1:
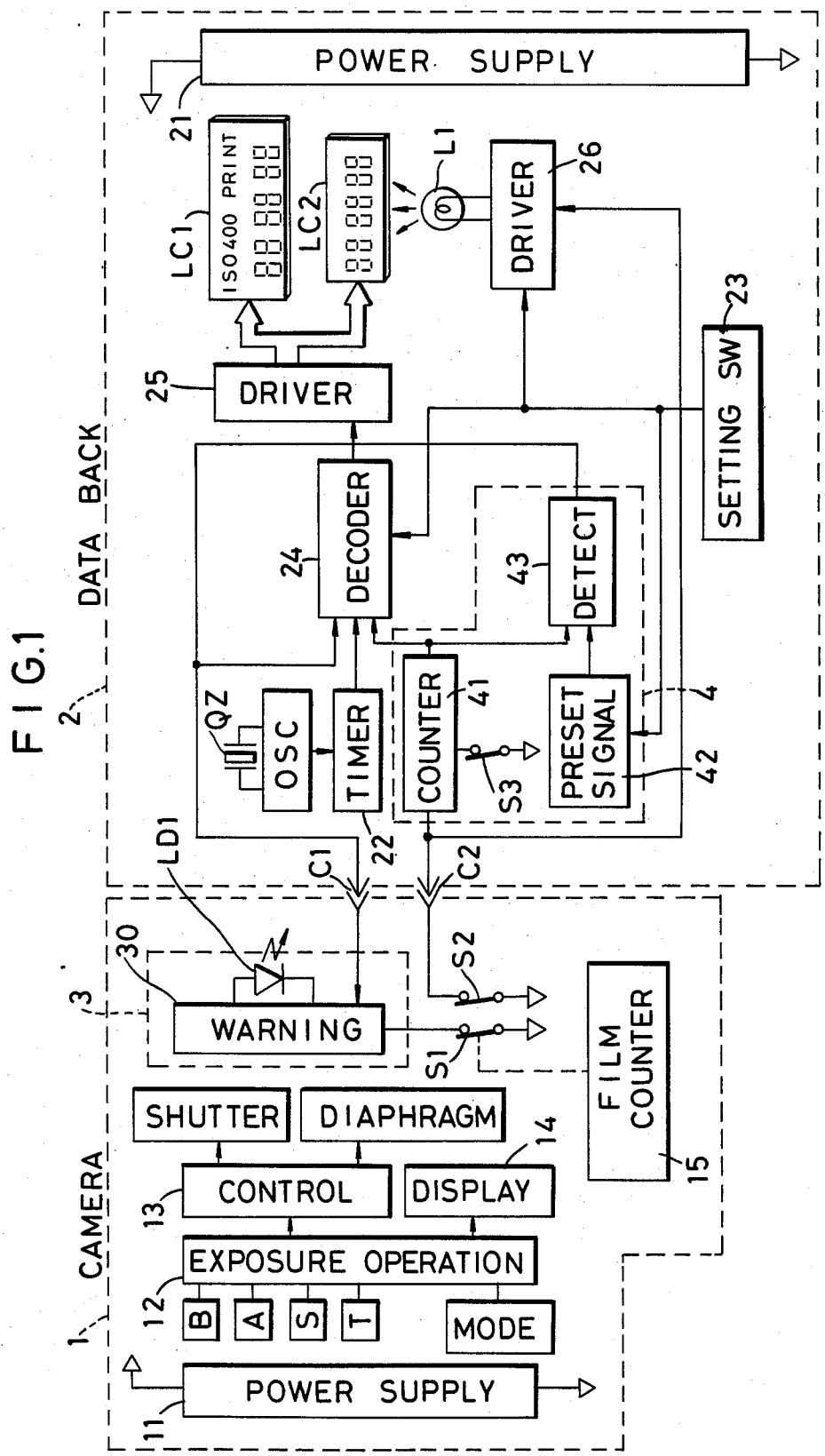
FIG. 1 is a block diagram showing a first embodiment of the present invention.

Referring to FIG. 1 showing a first embodiment of the present invention, a data back unit 2 for recording photographing data from the rear face of the photographic film can be mounted on a camera 1.

The camera 1 is provided with a power supply circuit 11, an exposure operation circuit 12, a control circuit 13, a display circuit 14, a film counter 15, a detection switch S1, a record switch S2 and a warning means 3.

The exposure operation circuit 12 performs a calculation by selecting a suitable combination of object brightness information B, lens aperture information A, film sensitivity information S and shutter speed information T according to the selection of control mode, and transmits an output to the control circuit 13 and the display circuit 14. For example, if an aperture priority mode is selected, a calculation is made on the object brightness information B, lens aperture information A and film sensitivity information S to provide a signal corresponding to an appropriate shutter speed.

The display circuit 14 displays, in response to the output signal from the exposure operation circuit 12, an appropriate shutter speed or an appropriate aperture value for example in a view finder.

Also in response to the output signal from the exposure operation circuit 12, and further in response to sequence signals generated at determined timings in relation for example to the elevating motion of a mirror to be initiated by an unrepresented shutter release button, the control circuit 13 drives a leading curtain and a trailing curtain of a shutter and a lens diaphragm mechanism so as to obtain manually or automatically determined values of shutter speed and lens aperture.

The film counter 15 rotates, at every film take-up operation, a disk bearing printed numbers which are rendered observable through a small window. Said disk is provided with a pin, which closes the detection switch S1 for example when the number of film take-up operations or of shots reaches 30.

The warning means 3 is composed of a warning circuit 30 and a light-emitting diode LD1, which is turned on through said circuit when the detection switch S1 is closed.

The record switch S2 is closed at each actuation of the shutter release button for photograph taking, and a resulting shot signal is transmitted to the data back unit 2.

The data back unit 2 is provided with a power supply circuit 21, a quartz element Qz and an oscillator circuit OSC constituting a quartz oscillator, a timer circuit 22 for time measurement according to an exact oscillation frequency from said oscillator, warning signal generating means 4 which counts the number of shot signals from the camera 1 or of exposures therein and generates a warning signal for activating the warning circuit 30 when the obtained count reaches a number of exposures preset in the data back unit, a setting switch 23 which can select either a clock display mode, or a shot number display mode, or a warning mode, or a combination of said modes, and which allows presetting of a number of shots at which the warning to be given, a decoder 24 which receives and decodes a time signal from the timer circuit 22 or a shot number signal or a warning signal from the warning signal generating means 4 according to the mode selected by the setting switch 23, a first driver 25 for driving liquid crystal display unit LC1, LC2 and a second driver 26 for driving a lamp L1.

The warning signal generating means 4 is composed of a counter 41 for counting the record signals supplied from the record switch S2 through a connector C2; a pre-set circuit 42 for retaining the pre-set number of exposures selected by the setting switch 23 and releasing a corresponding signal; a detection circuit 43 for supplying a warning signal to the decoder 24 and to the warning circuit 30 through a connector C1 when the count of the shot signals reaches the pre-set number of exposures; and a switch S3 for to be closed when the data back unit 2 is mounted on the camera 1 to enable the counter 41.

The liquid crystal display unit LC1 is positioned at the outer wall of the data back unit 2 for allowing observation of the display from the exterior. On the other hand, the liquid crystal display unit LC2 is incorporated in a pressure plate pressing the rear face of the photographic film in the camera, so that the content of display can be recorded on said film when the lamp L1 is lighted. Whether such display is to be recorded on the film or not is selected by the setting switch 23.

In the following there will be explained the function of the above-described first embodiment.

When the data back unit 2 is not mounted on the camera 1, the pin on the disk of the film counter 15 turns on the detection switch S1 when the number of film take-up operations or of shots exceeds 30, whereby the warning circuit 30 is activated to light the light-emitting diode LD1 to inform the user that all the exposures on the current film will soon be completed.

In case the data back unit 2 is mounted on the camera 1 and the clock display mode is selected by the setting switch 23, the timer circuit 22 measures time in response to the oscillation frequency from the oscillator circuit OSC and generates time signals which are decoded in the decoder 24 and transmitted to the driver 25 for displaying date, hour and minute or year, month and date on the liquid crystal display unit LC1. Said driver 25 also drives the liquid crystal display unit LC2 at the same time. Thus, when the record switch S2 is closed to transmit the record signal through the connector C2 to the driver 26, the lamp L1 is turned on by said driver 26 whereby the content of display on the liquid crystal display unit LC2 is recorded on the photographic film loaded in the camera.

When the data back unit 2 is mounted on the camera 1 and the clock display mode is selected as explained above, or when the warning mode by the data back unit 2 is not selected, the light-emitting diode is lighted when the detection switch S1 is closed.

Then, in case the camera back unit 2 is mounted on the camera 1, the warning mode is selected by the setting switch 23 and a number of shots at which the warning is to be given is preset, the preset circuit 42 supplies the detection circuit 43 with a signal corresponding to the preset number of shots while the counter 41 supplies a signal indicating the count of the record signals from the record switch S2. When said count of the record signals reaches the preset number of shots, the detection circuit 43 supplies a warning signal through the decoder 24 to the driver 25 to provide a warning display on the liquid crystal display unit LC1, for example by flashing of seven display segments. At the same time the warning signal is also set through the connector C1 to the camera. In response to said warning signal, the warning circuit 30 in the camera is activated to light the light-emitting diode LD1, thus providing a warning.

Thus, when the data back 2 is set to the warning mode, the warning circuit 30 is not activated by the detection switch S1 but only by the warning signal from the data back 2. Also it is possible to select the warning mode while the liquid crystal display unit LC1 displays the clock or the number of shots or without data recording on the photographic film, through suitable actuation of the setting switch 23.

Now reference is made to FIG. 2 for explaining a second embodiment of the present invention.

In the camera side, warning means 103 connected to a battery E1 is composed of a light-emitting diode LD1, an NPN transistor Q1, a PNP transistor Q2 and resistors R1–R5.

In the data back, warning signal generating means 104 connected to a battery E2 is composed of a preset circuit 42, a counter 41, a detecting circuit 143, an NPN transistor Q3, a PNP transistor Q4 and resistors R6–R10. The detection circuit 143 is so constructed as to provide an H-level signal and an L-level signal respectively at output terminals a, b when the warning mode is not selected by a setting switch 23; H-level signals at said output terminals a, b when the warning mode is selected but the content of the preset circuit 42 is larger than that of the counter 41; and L-level signal at said output terminals a, b when the content of the counter 41 exceeds that of the preset circuit 42.

In case the data back is not mounted on the camera, when the detection switch S1 is turned on in cooperation with the film counter, the PNP transistor Q2 is turned on to turn on in turn the NPN transistor Q1, thereby lighting the light-emitting diode LD1 and thus providing a warning.

The function when the data back is mounted on the camera is as follows.

In case the warning mode is not selected, the detection circuit 143 turns off the NPN transistor Q3 and the PNP transistor Q4. Consequently, in this state, the connector C1 of the data back shows a high impedance. Thus, as if the data back is not mounted, the light-emitting diode LD1 is lighted in response to the closing of the detection switch S1.

In case the warning mode is selected but the count of record signals from the camera does not reach the preset number of shots, the detection circuit 143 turns off the PNP transistor Q4 while it turns on the NPN transistor Q3, whereby the data back provides an L-level output to the connector C1. In such state, the base of the NPN transistor Q1 of the camera is grounded through the connector C1, so that the NPN transistor Q1 continues to be turned off and the light-emitting diode LD1 is not lighted even when the detection switch S1 is closed.

Then, when the count of the record signals reaches the preset number of shots as said count progresses, the detection circuit 143 turns on the PNP transistor Q4 and turns off the NPN transistor Q3 whereby the data back provides an H-level output to the connector C1. In this state a high voltage is supplied to the base of the NPN transistor Q1 through the connector C1 to turn on said NPN transistor Q1, thus lighting the light-emitting diode LD1.

The resistor R6 is provided to limit the shortcircuit current in case the NPN transistor Q3 and the PNP transistor Q4 are simultaneously turned on in a transient state.

As explained in the foregoing, the second embodiment is featured by a fact that the transmission channel of the data back connected to the connector C1 can assume so-called three states, i.e. H-level, L-level and high impedance states. In said second embodiment, the high impedance state represents a condition same as in the absence of the data back, while the L-level state represents a condition of prohibiting the warning by the closing of the detection switch S1, and the H-level state represents a condition of forcedly providing the warning.

Now reference is made to FIGS. 3 to 5 for explaining a third embodiment of the present invention.

At first referring to FIG. 3, showing the principal parts of the third embodiment, the camera is provided therein with a microcomputer A2, of which an output port P4 is connected to an NPN transistor Q1, a light-emitting diode LD1 controlled by said transistor, and a current limiting resistor R1. Among three input ports P1–P3 of the microcomputer A2, the input ports P1, P2 receive a warning signal from the data back through connectors C4, C5, and are also connected to a pull-up resistor R.

A detection switch S1 linked with the film counter is connected to the other input port P3.

The signal of a record switch S2 is independently transmitted to the data back through the connector C2.

The data back is provided with a microcomputer A3, of which output ports P5, P6 transmit signals to the aforementioned connectors C4, C5 to the camera. The record signal supplied through the connector C2 is given to an input port P7. Another input port P8 is connected to a switch S3.

The function of the above-described circuit is as follows.

The levels of the input ports P1, P2 of the microcomputer A2 and the corresponding level of the output port P4 are correlated as shown in the following table.

TABLE

| Input port | P1 | 0 | 0 | 1 | 1 |
|---|---|---|---|---|---|
|  | P2 | 0 | 1 | 0 | 1 |
| Output port | P4 | 0 | 0 | 1 | dependent on S1 |

In case the data back is not mounted on the camera, the connectors C4, C5 are left open, and an H-level signal is by the pull-up resistor R to the input ports P1, P2. In this case, therefore, the output of the output port P4 is dependent on the state of the detection switch S1 as shown in the foregoing table. Stated differently, the level of the output port P4 is determined by the level of the input port P3 to which the detection switch S1 is connected. Thus, when the detection switch S1 is closed and a 0-level signal is given to the input port P3, the output port P4 is shifted to the 1-level, thereby turning on the NPN transistor Q1 and lighting the light-emitting diode LD1 for warning.

Now reference is made to a flow chart shown in FIG. 4 for explaining the function of the microcomputer A2.

Referring to FIG. 4, a step 1 inspects the level of the input port P1. If it is at the 0-level, the program proceeds to a step 5 to shift the output port P4 to 0-level and the program is terminated.

On the other hand, if the input port P1 is at the 1-level in the step 1, a step 2 inspects the level of the input port P2. If it is at the 1-level corresponding to a mode of depending on the detection switch S1 of the camera, a step 3 inspects the level of the input port P3. If the input port P3 is at the 0-level or if the input port P2 is at the 0-level in the step 2, both requiring a warning, a step 4 shifts the output port P4 to 1-level to light the light-emitting diode LD1 and the program is terminated.

The microcomputer A3 of the data back functions in the following manner.

When the switch S3 is closed, a counter in the microcomputer A3 counts the number of closings of the record switch S2, transmitted from the camera through the connector C2. When said count is smaller than the preset number of shots, the microcomputer A3 maintains the output ports P5 and P6 respectively at the 0-level and 1-level. When said count reaches said preset number, the microcomputer A3 shifts said output ports P5 and P6 respectively to the 1-level and 0-level, and these warning signals are transmitted, through the connectors C4, C5, to the input ports P1, P2 of the camera to cause a warning.

Now reference is made to a flow chart in FIG. 5 for explaining the function of the above-mentioned microcomputer A3.

At first a step 11 identifies whether the warning mode, in which the warning means 3 of the camera can be controlled from the data back, is selected. If not, the program proceeds to a step 15 to shift the output ports P5, P6 to 1-level, whereby the light-emitting diode LD1 is turned on when the detection switch S1 is closed.

On the other hand, when the warning mode is selected, a step 12 identifies whether a warning is to be provided or not, by comparing the aforementioned count with the preset number of shots.

If the warning is to be given, a step 14 shifts the output ports P5, P6 respectively to the 1-level and 0-level. On the other hand, if the warning need not be provided, a step 13 shifts the output ports P5, P6 respectively to 0-level and 1-level, and the routine is completed.

In this manner, the use of microcomputers both in the camera and the data back allows to achieve warning control by means of signal transmission between the input/output ports of said microcomputers. The signal transmission between the microcomputers may also be achieved by serial transmission. It is also possible to achieve a similar function by employing a microcomputer either in the camera or in the data back and employing so-called random logic in the other. Furthermore the signal transmission may also be in analog form instead of digital form, for example by a circuit which turns on or off the light-emitting diode respectively when an approximately half of the power supply voltage or a ground level is transmitted to the camera, and in which the function depends on the detection switch of the camera when the power supply voltage is supplied to the camera.

Now reference is made to FIG. 6 for explaining a sixth embodiment of the present invention.

In a camera 301, there are serially connected a battery E1, a power switch S4, a resistor R1, a light-emitting diode LD1, a selector switch S5 and a detection switch S1.

The selector switch S5 is always closed when the camera body is used alone. The detection switch S1 is closed when the remaining amount of film becomes little. If the power switch S4 is closed in such state, the light-emitting diode LD1 is lighted through the resistor R1 to provide a warning.

The movable contact of said selector switch S5 is exposed in a hole 307 provided in a rear cover of the camera, corresponding to the data back to be mounted on said camera.

The data back is provided with a pin 309, protruding a hole 311 at a position corresponding to the aforementioned hole 307 of the camera body. Said pin 309 is constantly biased by a spring 313 toward the outside of the data back, and is electrically connected with collector of an NPN transistor Q10, which is controlled by a circuit A4. Said circuit A4 is similar to the warning signal generating means 4 shown in FIG. 1 and generates an H-level signal when the number of shots reaches the preset number of exposures.

When such data back is mounted on the camera, the pin 309 enters the hole 307 and presses the movable contact 305 of the selector switch S5 to open the contact, whereby the detection switch S1 becomes irrelevant to the function of the light-emitting diode LD1. Consequently the light-emitting diode LD1 is not turned on when the remaining amount of the film becomes little to close the detection switch S1.

On the other hand, said movable contact 305 of the selector switch S5 becomes connected to the transistor Q10 through the pin 309, whereby the light-emitting diode LD1 is lighted only by the warning signal released by the circuit A4 when the count of the record signals from the camera reaches the preset number of shots.

The above-described embodiment can be transformed to a simple rear cover with a pin 309, by omitting the circuit A4 and the transistor Q10. Thus, if the warning is not required, warning can be avoided by mounting such rear cover.

In the foregoing embodiments the function of the camera is controlled by a data back unit, but it is also possible to achieve similar functions by an accessory capable of receiving a signal for each shot for counting the number of shots, for example a flash unit.

In addition to the simple warning by the light-emitting diode LD1 in the foregoing embodiments, it is also possible to prohibit the actuation of the shutter release button, in case the film take-up operation to the end of film may cause damage thereto by the tension thereof for example at photographing in a low temperature atmosphere.

In the foregoing embodiments, the detection switch S1 is provided in the camera. However there is already known a motor drive unit, to be mounted on a camera, which is provided with a subtractive film counter and prohibits the function of motor drive as well as of camera at the end of film. Even in the use of such unit, it is possible to control the warning by the data back when mounted as in the foregoing embodiments.

What is claimed is:

1. A photographing system comprising:
a camera comprising:
    means for generating an output signal at each exposure of the film;
    counter means subjected to stepwise increment at each of said exposures and adapted to generate an output after counting a determined number; and
    warning means to be activated in response to the output of said counter means; and
an accessory unit to be connected to said camera and comprising:
    means for retaining a number of exposures to be preset by the operator;
    means for accumulating the number of said output signals generated by said camera; and
    means for supplying a warning signal to said camera for activating said warning means when the accumulated number of said output signals reaches said preset number of exposures.

2. A photographing system according to claim 1, wherein said camera further comprises means for prohibiting said warning means from responding to the output of said counter means while said camera is connected to said accessory unit.

3. A photographing system according to claim 1, wherein said accessory unit comprises setting means for generating a control output signal, according to the operation of user, for enabling the control of the warning means of said camera, and said camera comprises means for prohibiting said warning means from responding to the output of said counter means, in response to said control output signal.

4. A photographing system according to claim 3, wherein said counter means comprises switch means to be rendered conductive to drive said warning means after counting said determined number, and said prohibiting means forcedly renders said switch means non-conductive in response to said control output signal and conductive in response to said warning signal.

5. A photographing system according to claim 1, further comprising electrical connection means provided between said camera and said accessory unit for transmitting the output signal of said camera to said accessory unit and the warning signal of said accessory unit to said camera.

6. An accessory unit to be mounted on a camera which generates an output signal at each exposure of the film and provides a warning when the number of exposures of said film reaches a determined number, comprising:
    electrical connection means provided between said accessory unit and said camera;
    means for receiving said output signals through said electrical connection means and counting the number of generations of said output signals;
    means for presetting information on the number of exposures; and
    means for supplying a warning signal to said camera through said electrical connection means, when thus counted number reaches a number of exposure corresponding to said preset information.

7. An accessory unit according to claim 6, wherein said preset means comprises means to be operated by an operator for entering said information, and means for retaining information thus entered.

8. An accessory unit according to claim 6, further comprising means to be operated by the operator for selecting either an enable mode or a disable mode, wherein said selecting means is adapted to form a conductive state between said warning signal generating means and said electrical connection means when said enable mode is selected, and to form a non-conductive state between said warning signal generating means and said electrical connection means when said disable mode is selected.

9. An accessory unit according to claim 8, wherein said electrical connection means comprises an output terminal which is maintained at a first electrical level in response to said warning signal, or at a second electrical level different from said first electrical level in the absence of said warning signal, or is electrically rendered open when said disable mode is selected.

10. A data recording attachment to be mounted on a camera which generates an output signal at each exposure of the film and provides a warning when the number of exposures of said film reaches a determined number, comprising:
    means for receiving said output signal through electrical connection means provided between said camera and said receiving means;
    display means for displaying data relating to photographing and adapted to project said display onto the film of said camera in synchronization with said output signal;

means for counting the number of generation of said output signals;

means for presetting information relating to the number of exposures; and means for supplying a warning signal to said camera through said electrical connection means when said counted number reaches the number of exposures corresponding to said preset information.

* * * * *